(12) United States Patent
Bolen et al.

(10) Patent No.: US 8,380,674 B1
(45) Date of Patent: Feb. 19, 2013

(54) SYSTEM AND METHOD FOR MIGRATING LUN DATA BETWEEN DATA CONTAINERS

(75) Inventors: David Brittain Bolen, Durham, NC (US); David W. Minnich, Hillsborough, NC (US)

(73) Assignee: NetApp, Inc., Sunnyvale, CA (US)

( * ) Notice: Subject to any disclaimer, the term of this patent is extended or adjusted under 35 U.S.C. 154(b) by 274 days.

(21) Appl. No.: 11/971,329

(22) Filed: Jan. 9, 2008

(51) Int. Cl.
*G06F 7/00* (2006.01)

(52) U.S. Cl. ............ 707/657; 711/5; 711/170; 711/112; 711/203; 711/114; 707/661

(58) Field of Classification Search .................. 707/657, 707/661; 711/5, 170, 112, 114
See application file for complete search history.

(56) References Cited

U.S. PATENT DOCUMENTS

| | | |
|---|---|---|
| 4,570,217 A | 2/1986 | Allen et al. |
| 4,598,357 A | 7/1986 | Swenson et al. |
| 4,761,785 A | 8/1988 | Clark et al. |
| 4,843,541 A | 6/1989 | Bean et al. |
| 4,896,259 A | 1/1990 | Jacobs et al. |
| 4,899,342 A | 2/1990 | Potter et al. |
| 4,916,608 A | 4/1990 | Shultz |
| 5,124,987 A | 6/1992 | Milligan et al. |
| 5,129,088 A | 7/1992 | Auslander et al. |
| 5,155,835 A | 10/1992 | Belsan |
| 5,163,131 A | 11/1992 | Row et al. |
| 5,202,979 A | 4/1993 | Hillis et al. |
| 5,278,979 A | 1/1994 | Foster et al. |
| 5,426,747 A | 6/1995 | Weinreb et al. |
| 5,568,629 A | 10/1996 | Gentry et al. |
| 5,581,724 A | 12/1996 | Belsan et al. |
| 5,870,734 A | 2/1999 | Kao |
| 5,897,661 A | 4/1999 | Baranovsky et al. |
| 5,917,723 A * | 6/1999 | Binford ............................. 700/2 |
| 5,941,972 A | 8/1999 | Hoese et al. |
| 5,944,789 A | 8/1999 | Tzelnic et al. |
| 5,963,962 A | 10/1999 | Hitz et al. |
| 6,038,570 A | 3/2000 | Hitz et al. |
| 6,061,770 A | 5/2000 | Franklin |
| 6,081,875 A | 6/2000 | Clifton et al. |
| 6,128,627 A | 10/2000 | Mattis et al. |
| 6,332,177 B1 * | 12/2001 | Humlicek .................... 711/114 |

(Continued)

FOREIGN PATENT DOCUMENTS

WO  WO 89/10594  11/1989

OTHER PUBLICATIONS

Theimer et al., "Preemptable Remote Execution Facilities for the V-System," ACM 1985.*

(Continued)

*Primary Examiner* — Cheyne Ly
(74) *Attorney, Agent, or Firm* — Cesari and McKenna, LLP (57) ABSTRACT

A system and method for lun migration between data containers, such as aggregates of a storage system is provided. A new destination lun is created on a destination aggregate. A background copy process is then started that copies all data from a source lun on a source aggregate to the destination lun. The storage system continues to process client-originated data access requests directed to the source lun while the background copying continues. Once all the data of the source lun has been copied to the destination lun, processing of data access requests to the lun(s) is quiesced by the storage system. Lun maps of the storage system are then updated and processing of the client-originated data access requests is resumed with those requests now being directed to the destination lun.

33 Claims, 7 Drawing Sheets

U.S. PATENT DOCUMENTS

| | | | |
|---|---|---|---|
| 6,341,341 | B1 | 1/2002 | Grummon et al. |
| 6,457,021 | B1 | 9/2002 | Berkowitz et al. |
| 6,618,798 | B1 | 9/2003 | Burton et al. |
| 6,636,879 | B1 | 10/2003 | Doucette et al. |
| 6,721,764 | B2 | 4/2004 | Hitz et al. |
| 6,983,295 | B1* | 1/2006 | Hart .................... 707/610 |
| 7,085,883 | B1* | 8/2006 | Dalgic et al. ........... 711/114 |
| 7,107,385 | B2 | 9/2006 | Rajan et al. |
| 7,127,577 | B2 | 10/2006 | Koning et al. |
| 7,231,412 | B2 | 6/2007 | Hitz et al. |
| 7,236,987 | B1* | 6/2007 | Faulkner et al. ............... 1/1 |
| 7,366,853 | B2* | 4/2008 | Honda et al. ........... 711/156 |
| 7,395,370 | B2* | 7/2008 | Ukai et al. ............. 711/114 |
| 7,409,494 | B2* | 8/2008 | Edwards et al. ........ 711/114 |
| 7,546,302 | B1* | 6/2009 | Coatney et al. ............... 1/1 |
| 7,844,584 | B1* | 11/2010 | Griess ................... 707/704 |
| 8,005,793 | B1* | 8/2011 | Jernigan, Iv ........... 707/639 |
| 2003/0069903 | A1* | 4/2003 | Gupta et al. ............ 707/204 |
| 2003/0131182 | A1* | 7/2003 | Kumar et al. ............... 711/5 |
| 2003/0172149 | A1* | 9/2003 | Edsall et al. ............ 709/224 |
| 2004/0024961 | A1* | 2/2004 | Cochran et al. ......... 711/112 |
| 2004/0030668 | A1 | 2/2004 | Pawlowski et al. |
| 2004/0044698 | A1* | 3/2004 | Ebata et al. ............. 707/200 |
| 2004/0186968 | A1* | 9/2004 | Factor et al. ............ 711/162 |
| 2005/0055402 | A1* | 3/2005 | Sato ....................... 709/205 |
| 2005/0120260 | A1* | 6/2005 | Suzuki et al. ............... 714/5 |
| 2005/0246401 | A1* | 11/2005 | Edwards et al. ........ 707/205 |
| 2006/0236056 | A1* | 10/2006 | Nagata ................... 711/165 |
| 2007/0022264 | A1* | 1/2007 | Bromling et al. ....... 711/162 |
| 2007/0061454 | A1 | 3/2007 | Lee et al. |
| 2008/0010234 | A1* | 1/2008 | Nakagawa et al. .......... 707/1 |
| 2008/0275925 | A1* | 11/2008 | Kimmel .................. 707/204 |
| 2009/0024676 | A1* | 1/2009 | Boyd et al. ............. 707/204 |

OTHER PUBLICATIONS

Patterson, D. A., et al., "A Case for Redundant Arrays of Inexpensive Disks (RAID)", Proceedings of the International Conference on Management Data (SIGMOD), Jun. 1988, pp. 109-116.

Akyurek, Sedat, Placing Replicated Data to Reduce Seek Delays, Department of Computer Science, University of Maryland, UMIACS-TR-91-121, CS-TR-2746, Aug. 1991.

Anderson, C., xFS Attribute Manager Design, Silicon Graphics, http://oss.sgi.com/projects xfs/design_docs/xfsdocs93_pdf/attributes.pdf, Oct. 1993, 15 pages.

Anderson, C., xFS NameSpace Manager Design, Silicon Graphics, http://oss.sgi.com/projects xfs/design_docs/xfsdocs93_pdf/naming.pdf, Oct. 1993, 12 pages.

Anderson, C., xFS Project Architecture, Silicon Graphics, http://oss.sgi.com/projects xfs/design_docs/xfsdocs93_pdf/arch.pdf, Oct. 1993, 15 pages.

Bitton, Dina, Disk Shadowing, Proceedings of the 14th VLDB Conference, LA, CA 1988.

Chaudhuri, Surajit, et al., Self-Tuning Technology in Microsoft SQL Server, Data Engineering Journal 22, Feb. 1999 pp. 20-27.

Chutani, Sailesh, et al., The Episode File System, In Proceedings of the USENIX Winter 1992.

Coyne, Robert A., et al., Storage Systems for National Information Assets, Proc. Supercomputing 92, Minneapolis, Nov. 1992, pp. 626-633.

Doucette, D., Space Manager Overview, Silicon Graphics Proprietary, Dec. 1993, 18 pages.

Doucette, D., xFS Kernel Threads Support, Silicon Graphics Proprietary, Oct. 1993, 3 pages.

Doucette, D., xFS Message System Design, Silicon Graphics Proprietary, Oct. 1993, 5 pages.

Doucette, D., xFS Simulation Environment, Silicon Graphics Proprietary, Oct. 1993, 4 pages.

Doucette, D., xFS Space Manager Design, Silicon Graphics Proprietary, Oct. 1993, 12 pages.

Ellis, S., et al., Getting Started with XFS Filesystems, Document No. 007-2549-001, Silicon Graphics, Inc., 1994, 129 pages.

Finlayson, Ross S., et al., Log Files: An Extended File Service Exploiting Write-Once Storage Department of Computer Science, Stanford University, Report No. STAN-CS-87-1177, Sep. 1987.

Gray, Jim, et al., The Recovery Manager of the System R Database Manager, ACM Computing Surveys, (13)2:223-242 1981.

Hecht, Matthew S., et al. Shadowed Management of Free Disk Pages with a Linked List, ACM Transactions on Database Systems, 8/4, Dec. 1983, pp. 503-514.

Howard, John, H. et al., Scale and Performance in a Distributed File System, Carnegie Mellon University, CMU-ITC-87-068, Aug. 1987.

Howard, John H., An Overview of the Andrew File System, Carnegie Mellon University, CMU-ITC-88-062 1988.

Howard, John, H. et al., Scale and Performance in a Distributed File System, ACM Trans. Computer System, 6(1), Feb. 1988 pp. 51-81.

Hu, Wei, UUIDs, Silicon Graphics Proprietary, Oct. 1993, 5 pages.

Kazar, Michael Leon, Synchronization and Caching Issues in the Andrew File System, Carnegie Mellon University, CMU-ITC-88-063.

Kazar, Michael L., et al., DEcorum File System Architectural Overview, USENIX Summer Conference, Anaheim, California, 1990.

Kemper, Alfons, et al., Performance Tuning for SAP R/3, Data Engineering Journal 22, Feb. 1999 pp. 33-40.

Kent, Jack et al., Optimizing Shadow Recovery Algorithms, IEEE Transactions on Software Engineering, 14(2): 155-168, Feb. 1988.

Kistler, et al., Disconnected Operation in the Coda File System, ACM Transaction on Computer Systems, vol. 10, No. 1, Feb. 1992, pp. 3-25.

Kleiman, S. R., Vnode: An Architecture for Multiple file Systems in Sun Unix, Proceedings of the USENIX Technical Conference, 1986, 10 pages.

Koeninger, R.K., xFS Design Documents, Silicon Graphics, Inc., Aug. 1999, 2 pages.

Lee, E., et al., Petal: Distributed Virtual Disks, Systems Research Center, Digital Equipment Corporation, Proceedings of the 7th International Conference on Architectural Support for Programming Languages and Operating Systems, ACM, 1996, 9 pages.

Leffler, S., et al., The Design and Implementation of the 4.3 BSD UNIX Operating System, Addison-Wesley, 1989, pp. 187-245.

Lorie, Raymond, A. Physical Integrity in a Large Segmented Database, ACM Trans. Database Syst., vol. 2, Mar. 1977, pp. 91-104.

McVoy, L.W., et al., Extent-Like Performance for a UNIX File System, Proceedings of the USENIX Conference, Winter 1991, 12 pages.

Nishimoto, M., The Log Manager (xLM), Silicon Graphics Proprietary, Mar. 1994, 10 pages.

Nishimoto, M., Log Manager Design, Silicon Graphics Proprietary, Dec. 1993, 11 pages.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988.

Patterson, D., et al., A Case for Redundant Arrays of Inexpensive Disks (RAID),_Technical Report, CSD-87-391, Computer Science Division, Electrical Engineering and Computer Sciences, University of California at Berkeley 1987.

Peterson, Zachary Nathaniel Joseph, Data Placement for Copy-on-Write Using Virtual Contiguity, University of CA, Santa Cruz, Master's Thesis for the Department of Science in Computer Science, Sep. 2002.

Quinlan, Sean, A Cached WORM File System, Software-Practice and Experience, 21(12):1289-1299 1991.

Rosenblum, Mendel, et al., The LFS Storage Manager, Computer Science Division, Electrical Engineering and Computer Sciences, Univ. of CA, presented at Summer '90 USENIX Technical Conference, Anaheim, CA Jun. 1990.

Rosenblum, Mendel, et al. The Design and Implementation of a Log-Structured File System Jul. 24, 1991 pp. 1-15.

Rosenblum, Mendel, The Design and Implementation of a Log-Structured File System, 1992 pp. 1-93.

Rosenblum, Mendel, et al., The Design and Implementation of a Log-Structured File System, In Proceedings of ACM Transactions on Computer Systems, (10)1:26-52, Feb. 1992.

Schiefer, Berni, et al., DB2 Universal Database Performance Tuning, Data Engineering Journal 22, Feb. 1999 pp. 12-19.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shasha, Dennis, Tuning Time Series Queries in Finance: Case Studies and Recommendations, Data Engineering Journal 22, Feb. 1999 pp. 41-47.

Sidebotham, Bob, Volumes: The Andrew File System Data Structuring Primitive, EEUG Conference Proceedings, Manchester, UK, Autumn 1986.

Subramanian, Muralidhar, et al., Performance Challenges in Object-Relational DBMSs, Data Engineering Journal 22, Feb. 1999 pp. 28-32.

Sweeney, A., 64 Bit File Access, Silicon Graphics Proprietary, Oct. 1993, 9 pages.

Sweeney, A., et al., Scalability in the XFS File System, Silicon Graphics, Inc., Proceedings of the USENIX 1996 Technical Conference, http://oss.sgi.com/projects/xfs/papers/xfs_usenix/index, 19 pages.

Sweeney, A., xFS Block Zeroing Mechanism, Silicon Graphics Proprietary, Aug. 1994, 6 pages.

Sweeney, A., xFS In-Core Inode Management, Silicon Graphics Proprietary, Nov. 1993, 1 page.

Sweeney, A., xFS Superblock Management, Silicon Graphics Proprietary, Dec. 1993, 4 pages.

Sweeney, A., xFS Transaction Mechanism, Silicon Graphics Proprietary, Oct. 1993, 18 pages.

Thekkath, C., et al., Frangipani: A Scalable Distributed File System, Systems Research Center, Digital Equipment Corporation, ACM SIGOPS Operating System Review, vol. 31, Issue 5, Dec. 1997, 14 pages.

Weikum, Gerhard, et al., Towards Self-Tuning Memory Management for Data Servers, Data Engineering Journal 22, Feb. 1999 pp. 3-11.

West, Michael, et al. The ITC Distributed File System: Prototype and Experience, Carnegie-Mellon University, Technical Report CMU-ITU-040, Mar. 1985.

xFS Detailed Design, Silicon Graphics, Apr. 1994, 12 pages.

Zayas, Edward R., AFS-3 Programmer's Reference: Architectural Overview, Transarc Corporation, Pittsburgh, PA, 1.0 edition 1991.

Callaghan, B., "NFS Version 3 Protocol Specification", Request for Comments (RFC) 1813 Jun. 1995, 118 pages.

Celerra File Server Architecture for High Availability, EMC2 where information lives, Aug. 1999, 12 pages.

Chen, Peter M., et al., An Evaluation of Redundant Arrays of Disks Using an Amdahl 5890 Peformance Evaluation, pp. 74-85, 1990.

Hitz, Dave et al., File System Design for an NFS File Server Appliance, Technical Report 3002, Rev. C395, presented Jan. 19, 1994, 23 pages.

McKusick, Marshall Kirk, et al., A Fast File System for UNIX, Computer Science Division, Department of electrical Engineering and Computer Sciences, Univ. of CA, Berkley, Feb. 18, 1994, 14 pages.

Miller, Ethan L., et al., RAMA: a File System for Massively Parallel Computers, 12.sup.th IEEE Symposium on Mass Storage Systems, Monterey CA, Apr. 1993, pp. 163-168.

Morris, James H., et al., Andrew: a Distributed Personal Computing Environment, Comm. of the ACM, vol. 29, Mar. 1986, pp. 184-201.

Network Appliance ends NAS-SAN war by Computerwire, http://www.theregister.co.uk/2002/10/102/network.sub.—appliance.sub.—en—ds.sub.—nassan.sub.—war/print.html, Published Wednesday, Oct. 2, 2002, 2 pages.

Performance Without Compromise: The Virtual Storage Architecture 1997, 11 pages.

Sandberg, Russel et al., Design and implementation of the Sun Network Filesystem. In Proc. Summer 1985 USENIX Conf., pp. 119-130, Portland OR (USA), Jun. 1985.

Wittle, Mark, et al., LADDIS: The next generation in NFS file server benchmarking, USENIX Association Conference Proceedings, Apr. 1993, 29 pages.

\* cited by examiner

SYSTEM AND METHOD FOR MIGRATING LUN DATA BETWEEN DATA CONTAINERS

FIELD OF THE INVENTION

The present invention relates to storage systems and, more specifically to storage systems capable of migrating a lun between aggregates or other data containers.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n, for a file system of size n−1 blocks.

The storage operating system may further implement a storage module, such as a RAID system, that manages the storage and retrieval of the information to and from the disks in accordance with input/output (I/O) operations. The RAID system is also responsible for parity operations in the storage system. Note that the file system only "sees" the data disks within its vbn space; the parity disks are "hidden" from the file system and, thus, are only visible to the RAID system. The RAID system typically organizes the RAID groups into one large "physical" disk (i.e., a physical volume), such that the disk blocks are concatenated across all disks of all RAID groups. The logical volume maintained by the file system is then "disposed over" (spread over) the physical volume maintained by the RAID system.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

The file system executing on the storage system may implement data containers, such as aggregates, which enable the use of flexible (or virtual) volumes. Aggregates are described in U.S. patent application Ser. No. 10/836,817, now issued as U.S. Pat. No. 7,409,494 on Aug. 5, 2008, entitled EXTENSION OF WRITE ANYWHERE FILE SYSTEM LAYOUT, by John Edwards et al., the contents of which are hereby incorporated by reference. Illustratively, a file system layout apportions an underlying physical volume into one or more data containers, such as flexible volumes, of the storage system. The underlying physical volume is another data container, such as an aggregate, comprising one or more groups of disks, such as RAID groups, of the storage system. The aggregate has its own physical volume block number (pvbn) space and maintains metadata, such as block allocation structures, within that pvbn space. Each flexible volume has its own virtual volume block number (vvbn) space and maintains metadata, such as block allocation structures, within that vvbn space.

The storage system may further implement virtual disk objects (vdisks) that are exported to clients as logical unit numbers (luns) to enable the storage system to service both Network Attached Storage (NAS) and Storage Area Network (SAN) environments. One example of such vdisks is described in U.S. patent application Ser. No. 10/216,453, now issued as U.S. Pat. No. 7,107,385, on Sep. 12, 2006, entitled STORAGE VIRTUALIZATION BY LAYERING VIRTUAL DISK OBJECTS ON A FILE SYSTEM, by Vijayan Rajan, et al., the contents of which are hereby incorporated by reference.

A number of disadvantages may arise in storage systems utilizing aggregates to store luns that are exported to clients. An administrator may desire to move a lun from one aggregate to another due to, e.g., load balancing, lack of storage space, etc. Migration of a lun from one aggregate (e.g., a source aggregate) to another (e.g., a destination aggregate) typically requires that the lun be unmounted which, in turn, requires suspension of all data access requests directed to the lun. The lun is then copied from the source aggregate to the destination aggregate before data access requests are restored. The time required to copy the lun may be substantial, especially if the lun is large, e.g., hundreds of gigabytes. Thus, during lun migration, clients are not able to access the lun via data access requests. In a modern IT environment, lack of client access to data for potentially tens of minutes (or hours) is generally unacceptable.

SUMMARY OF THE INVENTION

The present invention overcomes the disadvantages of the prior art by providing a system and method for lun migration between data containers, such as aggregates of a storage system. In response to initiation of the lun migration, either by an administrator initiated command or by an automated process, e.g., a load balancing process, a new destination lun is created on a destination aggregate. In the illustrative embodiment of the invention, a background copy process is then started that copies all data from a source lun on a source aggregate to the destination lun. Illustratively, the background process throttles its copy operations to limit their effect on overall storage system performance. The storage system continues to process client-originated data access requests directed to the source lun while the background copying continues. For example, in response to receiving a read request, the storage system serves the data from the source lun. However, in response to receiving a write request, a duplicate copy of the write request (including its write data) is made and the duplicate write requests are issued to both the source and destination luns.

Once all the data of the source lun has been copied to the destination lun, processing of data access requests to the lun(s) is quiesced by the storage system. Lun maps of the storage system are then updated and processing of the client-originated data access requests is resumed with those requests now being directed to the destination lun.

In an alternative embodiment of the present invention, a mirroring relationship is established between the source destination luns in response to the initiation of lun migration. Mirroring operations are then performed to copy the data from the source lun to the destination lun. Over time, an update interval between mirroring operations is shortened so that the destination lun is almost consistent with the source lun. Processing of client-originated data access requests is then quiesced and any non-processed requests are buffered. A final mirror update operation is performed to bring the destination lun into a consistent state with the source lun. The mirroring relationship is thereafter severed and the lun maps are updated to reference the destination lun. Processing of the data access requests, including previously buffered requests, is then resumed with the destination lun serving the requests.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

The present invention provides a system and method for lun migration between data containers, such as aggregates of a storage system. In response to initiation of the lun migration, either by an administrator initiated command or by an automated process, e.g., a load balancing process, a new destination lun is created on a destination aggregate. In the illustrative embodiment of the invention, a background copy process is then started that copies all data from a source lun on a source aggregate to the destination lun. Illustratively, the background process throttles its copy operations to limit their effect on overall storage system performance. The storage system continues to process client-originated data access requests directed to the source lun while the background copying continues. For example, in response to receiving a read request, the storage system serves the data from the source lun. However, in response to receiving a write request, a duplicate copy of the write request (including is write data) is made and the duplicate write requests are issued to both the source and destination luns.

Once all the data of the source lun has been copied to the destination lun, processing of data access requests to the lun(s) is quiesced by the storage system. Lun maps of the storage system are then updated and processing of the client-originated data access requests is resumed with those requests now being directed to the destination lun.

In an alternative embodiment of the present invention, a mirroring relationship is established between the source destination luns in response to the initiation of lun migration. Mirroring operations are then performed to copy the data from the source lun to the destination lun. Over time, an update interval between mirroring operations is shortened so that the destination lun is almost consistent with the source lun. Processing of client-originated data access requests is then quiesced and any non-processed requests are buffered. A final mirror update operation is performed to bring the destination lun into a consistent state with the source lun. The mirroring relationship is thereafter severed and the lun maps are updated to reference the destination lun. Processing of the data access requests, including previously buffered requests, is then resumed with the destination lun serving the requests.

A. Storage System Environment

Figure 1:
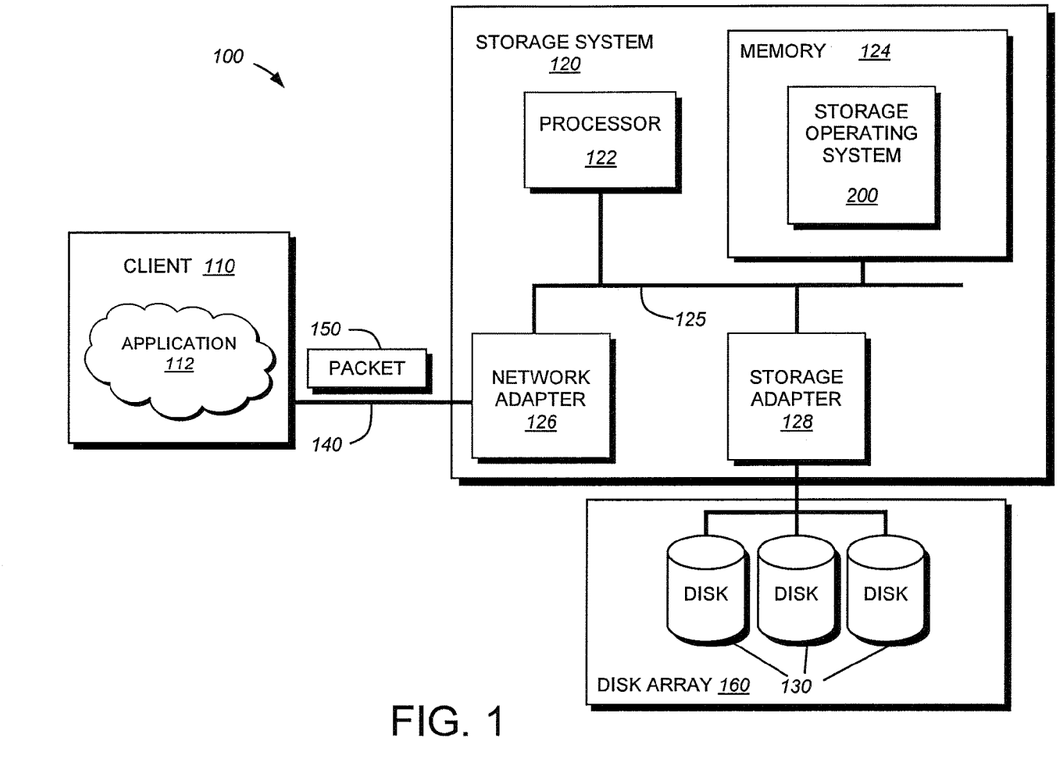
FIG. 1 is a schematic block diagram of an environment including a storage system in accordance with an illustrative embodiment of the present invention.

FIG. 1 is a schematic block diagram of an environment 100 including a storage system 120 that may be advantageously used with the present invention. The storage system is a computer that provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of directories, files and special types of files called virtual disks (vdisks or luns) on the disks.

In the illustrative embodiment, the memory 124 comprises storage locations that are addressable by the processor and adapters for storing software program code. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over the network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client 110 may request the services of the storage system, and the system may return the results of the services requested by the client, by exchanging packets 150 over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter 128 includes input/output (I/O) interface circuitry that couples to the disks over an I/O interconnect arrangement, such as a conventional high-performance, FC serial link topology. In alternative embodiments, the disks (writeable storage device media) 130 may comprise electronic media, e.g., Flash memory, etc. As such, the illustrative description of writeable storage device media comprising magnetic media (e.g., disks 130) should be taken as exemplary only.

Storage of information on array 160 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

To facilitate access to the disks 130, the storage operating system 200 implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention.

B. Storage Operating System

Figure 2:
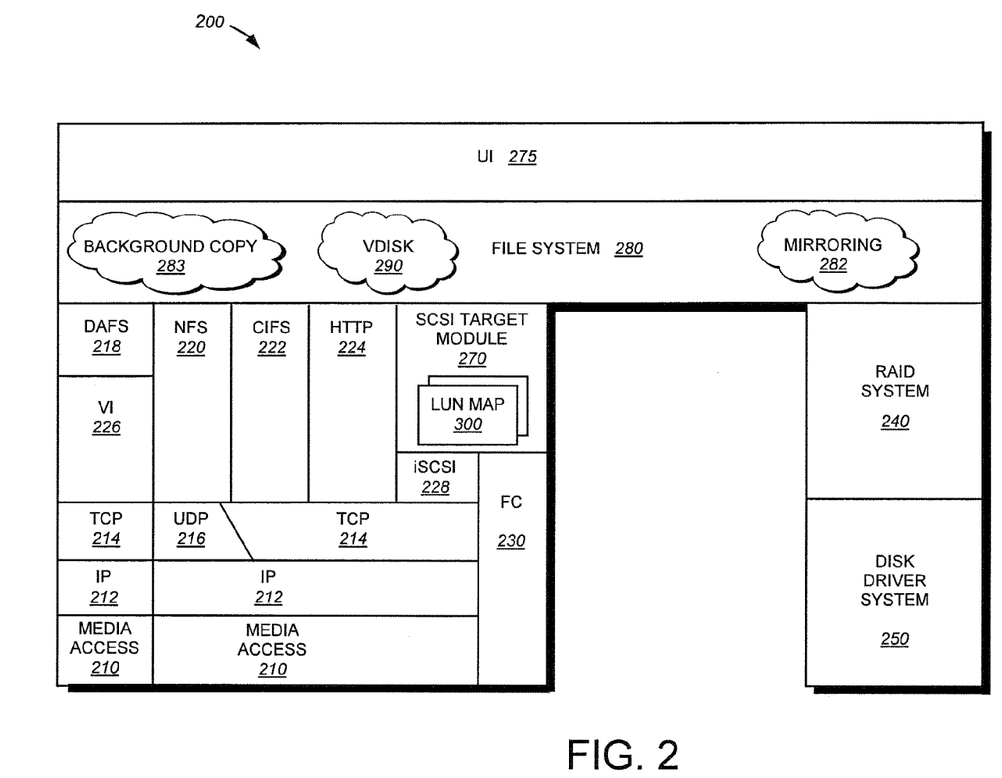
FIG. 2 is a schematic block diagram of an exemplary storage operating system for use on a storage system in accordance with an illustrative embodiment of the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A virtual interface (VI) layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 cooperates with the file system 280 to implement virtual disk objects (vdisks). The file system also illustratively includes a background copy process 283, described further below, that is utilized to implement lun migration in accordance with an illustrative embodiment of the present invention. In alternative embodiments, the file system 280 may include a mirroring process 282 that implements mirroring operations.

Figure 3:
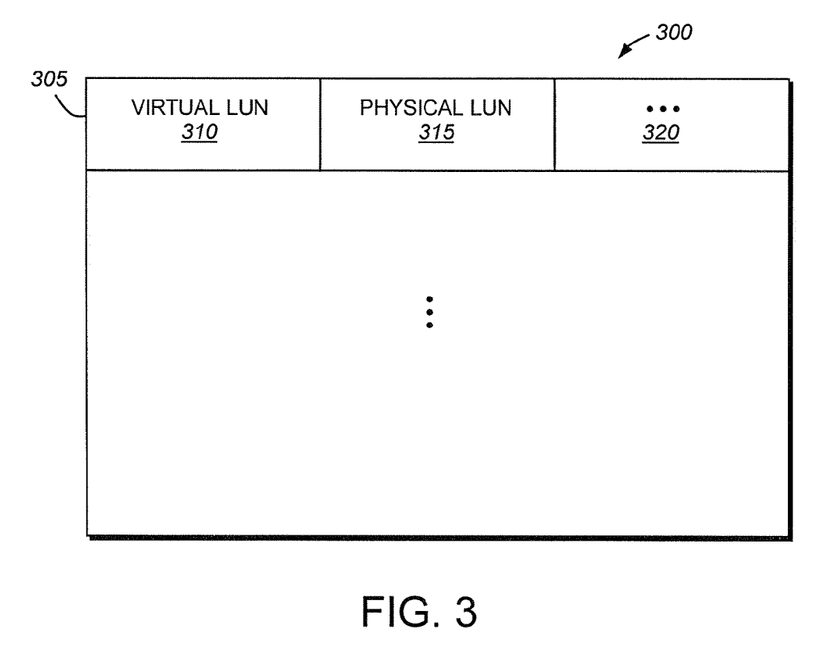
FIG. 3 is a schematic block diagram of a lun map in accordance with an illustrative embodiment of the present invention.

The SCSI target module 270 is disposed between the FC and iSCSI drivers 228, 230 and the file system 280 to provide a translation layer of the virtualization system between the block (lun) space and the file system space, where luns are represented as blocks. The SCSI target module 270 includes one or more lun maps 300, described further below, that are utilized to provide mappings between virtual lun values utilized by clients of the storage system to identify those luns to which they have access, and physical lun values utilized by the storage system for identifying the luns serviced by the stores age system.

The file system 280 is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (kB) blocks and using index nodes ("modes") to identify files and file attributes (such as creation time, access permissions, size and block location). The file system uses files to store metadata describing the layout of its file system; these metadata files include, among others, an mode file. A file handle, i.e., an identifier that includes an mode number, is used to retrieve an mode from disk.

Broadly stated, all modes of the write-anywhere file system are organized into the mode file. A file system (FS) info block specifies the layout of information in the file system and includes an mode of a file that includes all other modes of the file system. Each logical volume (file system) has an FS info block that is preferably stored at a fixed location within, e.g., a RAID group. The mode of the root FS info block may directly reference (point to) blocks of the mode file or may reference indirect blocks of the mode file that, in turn, reference direct blocks of the mode file. Within each direct block of the mode file are embedded modes, each of which may reference indirect blocks that, in turn, reference data blocks of a file.

Operationally, a request from the client 110 is forwarded as a packet 150 over the computer network 140 and onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in-core". If the information is not in-core, the file system 280 indexes into the mode file using the mode number to access an appropriate entry and retrieve a logical vbn. The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 130 and loads the requested data block(s) in memory for processing by the storage system. Upon completion of the request, the storage system (and operating system) returns a reply to the client 110 over the network 140.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the Data ONTAP software is an example of such a storage operating system implemented as a microkernel and including the file system layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage system 120. An example of a storage system that may be advantageously used with the present invention is described in U.S. Pat. No. 7,873,700 issued, on Jan. 18, 2011, entitled MULTI-PROTOCOL STORAGE APPLIANCE THAT PROVIDES INTEGRATED SUPPORT FOR FILE AND BLOCK ACCESS PROTOCOLS, by Brian Pawlowski, et al. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

FIG. 3 is a schematic block diagram of an exemplary lun map 300 in accordance with an illustrative embodiment of the present invention. Lun maps are data structures that are further described in U.S. patent application Ser. No. 10/619,122, now issued as U.S. Pat. No. 7,523,201 on Apr. 21, 2009, entitled SYSTEM AND METHOD FOR OPTIMIZED LUN MASKING, by Herman Lee, et al., the contents of which are hereby incorporated by reference. Illustratively, each initiator (client) that logs into the storage system is associated with a lun map 300 that is generated during the login process. The lun map data structure 300 illustratively comprises one or more entries 305, with one entry for each lun that the client is authorize to access on the storage system.

Each entry 305 comprises a virtual lun field 310, a physical lun field 315 and, in alternative embodiments, additional fields 320. The virtual lun field 305 identifies the lun value utilized by the client. The physical lun field 315 contains an identifier of the lun associated with the storage system. Lun map 300 may be utilized so that different clients may have the same luns mapped to different virtual lun values. For example, physical lun 1000 may be mapped to lun value 0 for client A, but mapped to lun value 5 for client B. When issuing a data access request to a lun serviced by the storage system, the client utilizes its virtual lun value. Upon receipt of the data access request, the storage system utilizes the lun map 300 to identify the appropriate physical lun to which to direct the request. Thus, the lun map 300 may be utilized by the storage system to efficiently map a predefined number of physical luns serviced by the storage system to a lun address space accessible by a particular client.

C. Flexible Volumes and Aggregates

The present invention illustratively utilizes a file system layout that apportions an underlying physical volume into one or more data containers, such as flexible volumes, of a storage system. The underlying physical volume is also a data container, such as an aggregate, comprising one or more groups of disks, such as RAID groups, of the storage system. The aggregate has its own pvbn space and maintains metadata, such as block allocation structures, within that pvbn space. Each flexible volume also has its own vvbn space and maintains metadata, such as block allocation structures, within that vvbn space. Notably, the block allocation structures of a flexible volume are sized to the flexible volume, and not to the underlying aggregate, to thereby allow operations that manage data served by the storage system (e.g., snapshot operations) to efficiently work over the flexible volume.

Figure 4:
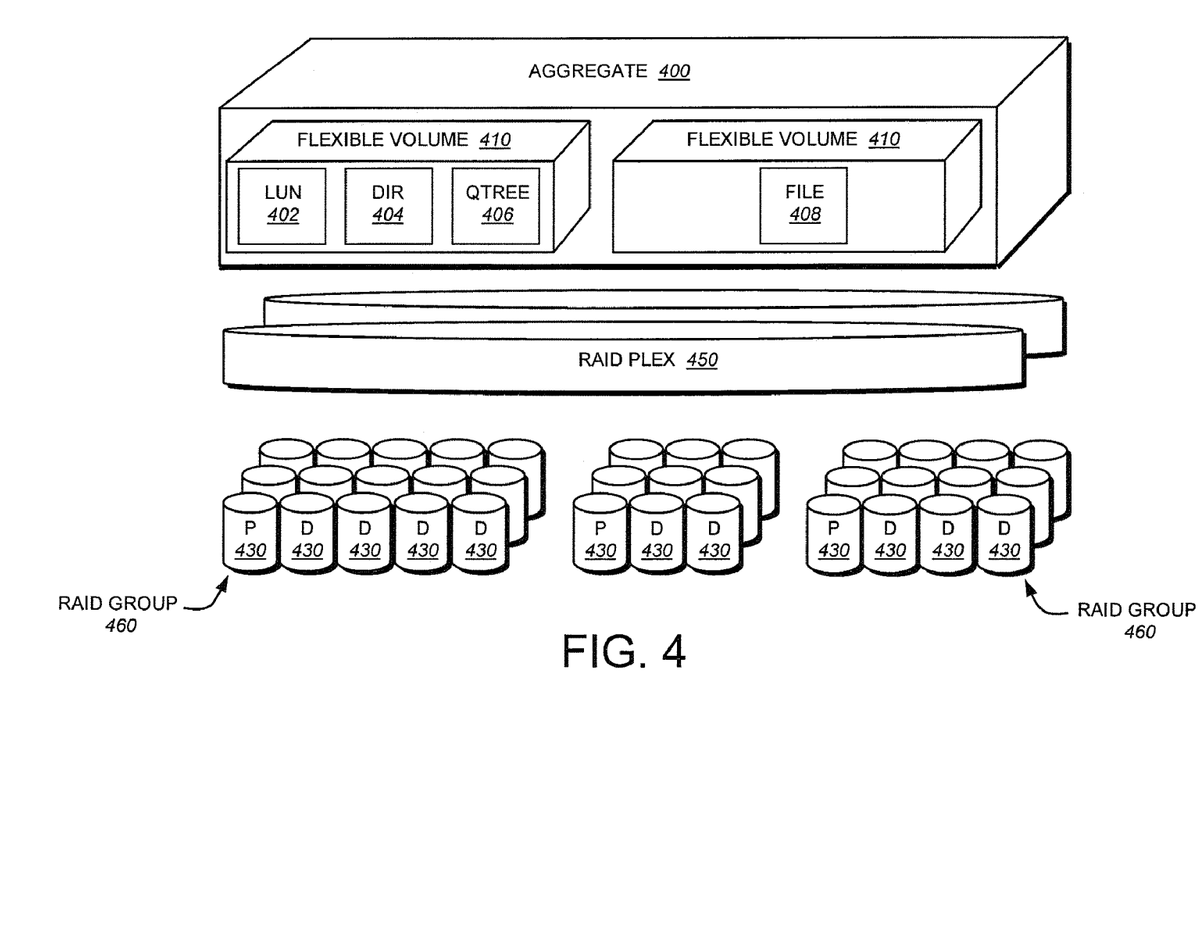
FIG. 4 is a schematic block diagram of an aggregate in accordance with an illustrative embodiment of the present invention.

FIG. 4 is a schematic block diagram of an aggregate 400 in accordance with an illustrative embodiment of the present invention. Luns (logical unit numbers identifying blocks) 402, directories 404, qtrees 406 and files 408 may be contained within flexible volume 410 that, in turn, are contained within the aggregate 400. The aggregate 400 is illustratively layered on top of the RAID system, which is represented by at least one RAID plex 450 (depending upon whether the storage configuration is mirrored), wherein each plex 450 comprises at least one RAID group 460. Each RAID group further comprises a plurality of disks 430, e.g., one or more data (D) disks and at least one (P) parity disk.

Whereas the aggregate 400 is analogous to a physical volume of a conventional storage system, a flexible volume is analogous to a file within that physical volume. That is, the aggregate 400 may include one or more flexible volumes 410 and wherein the sum of the storage space consumed by the flexible volume(s) is physically smaller than (or equal to) the size of the overall physical volume. The aggregate utilizes a "physical" pvbn space that defines a storage space of blocks provided by the disks of the physical volume, while each embedded flexible volume (within a file) utilizes a "logical" vvbn space to organize those blocks, e.g., as files. Each vvbn space is an independent set of numbers that corresponds to locations within the file, which locations are then translated to dbns on disks. Since the flexible volume 410 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to the pure logical volume in a file approach, the container file is a hidden file (not accessible to a user) in the aggregate that holds every block in use by the flexible volume. According to another aspect of the invention, the aggregate includes an illustrative hidden metadata root directory that contains subdirectories of flexible volumes:

WAFL/fsid/filesystem file, storage label file

Specifically, a "physical" file system (WAFL) directory includes a subdirectory for each flexible volume in the aggregate, with the name of subdirectory being a file system identifier (fsid) of the flexible volume. Each fsid subdirectory contains at least two files, a filesystem file and a storage label file. The storage label file is illustratively a 4 KB file that contains metadata similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

D. Lun Migration

The present invention provides a system and method for lun migration between data containers, such as aggregates of a storage system. In response to initiation of the lun migration, either by an administrator initiated command or by an automated process, e.g., a load balancing process, a new destination lun is created on a destination aggregate. In the illustrative embodiment of the invention, a background copy process is then started that copies all data from a source lun on a source aggregate to the destination lun. Illustratively, the background process throttles its copy operations to limit their effect on overall storage system performance. The storage system continues to process client-originated data access requests directed to the source lun while the background copying continues. For example, in response to receiving a read request, the storage system serves the data from the source lun. However, in response to receiving a write request, a duplicate copy of the write request (including its write data) is made and the duplicate write requests are issued to both the source and destination luns.

Once all the data of the source lun has been copied to the destination lun, processing of data access requests to the lun(s) is quiesced by the storage system. Lun maps of the storage system are then updated and processing of the client-originated data access requests is resumed with those requests now being directed to the destination lun.

In an alternative embodiment of the present invention, a mirroring relationship is established between the source destination luns in response to the initiation of lun migration. Mirroring operations are then performed to copy the data from the source lun to the destination lun. Over time, an update interval between mirroring operations is shortened so that the destination lun is almost consistent with the source lun. Processing of client-originated data access requests is then quiesced and any non-processed requests are buffered. A final mirror update operation is performed to bring the destination lun into a consistent state with the source lun. The mirroring relationship is thereafter severed and the lun maps are updated to reference the destination lun. Processing of the data access requests, including previously buffered requests, is then resumed with the destination lun serving the requests.

Figure 5:
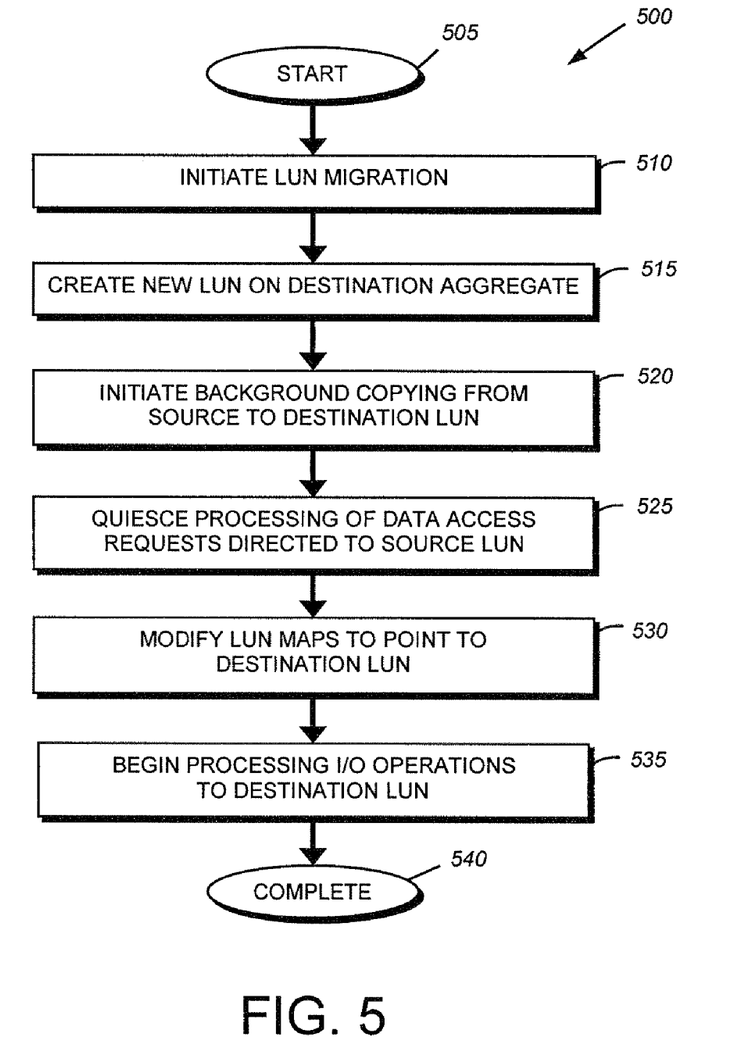
FIG. 5 is a flowchart illustrating the steps of a procedure for performing lun migration in accordance with an illustrative embodiment of the present invention.
Figure 6:
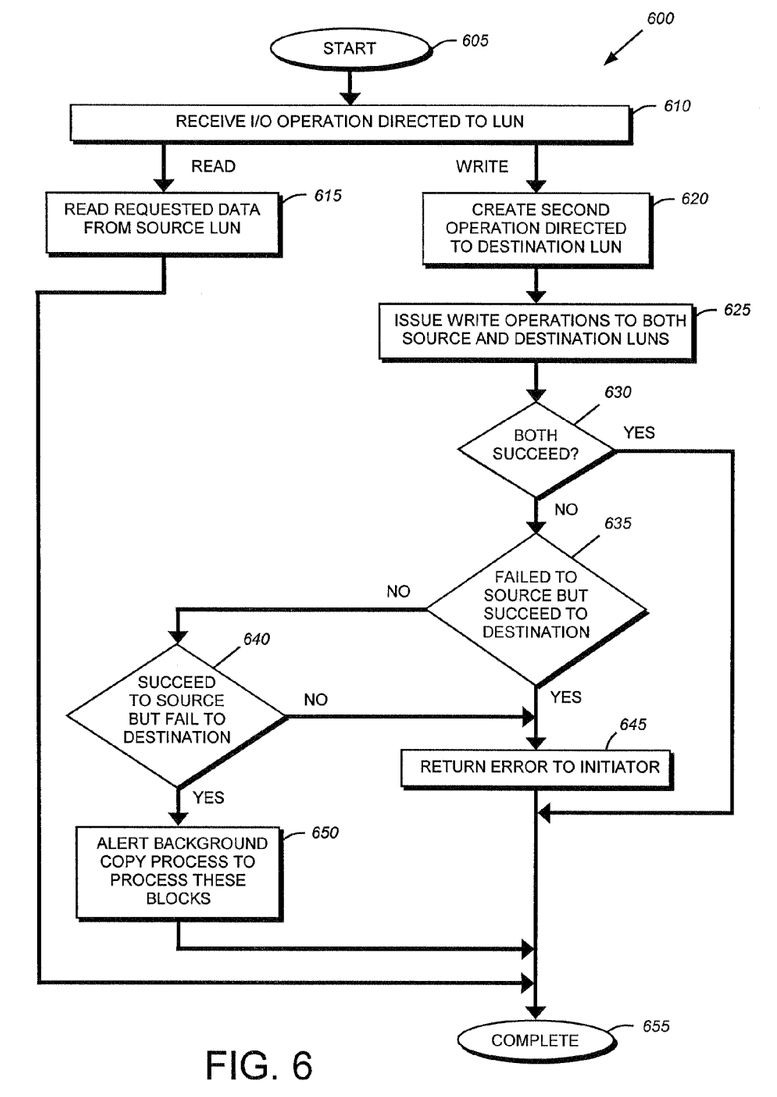
FIG. 6 is a flowchart illustrating the steps of a procedure for processing data access operations in accordance with an illustrative embodiment of the present invention.

FIG. 5 is a flowchart detailing the steps of a procedure 500 for performing lun migration in accordance with an illustrative embodiment of the present invention. The procedure 500 begins in step 505 and continues to step 510 where the lun migration is initiated by, e.g., an administrator executing a command. In alternative embodiments, the lun migration may be initiated by another process, e.g., a load balancing or other automated process executing within the storage operating system. As such, the initiation of the lun migration by administrator action should be taken as exemplary only. Once the lun migration has been initiated, the file system creates a new destination lun on the destination aggregate in step 515 using, e.g., conventional file system lun create operations. Once the destination lun has been created, the background copy process is initiated in step 520. Illustratively, the background copy process "walks through" each block of the lun and copies the data from the source lun to the destination lun. The process may throttle its copying rate based on, e.g., the overall data access rate to the aggregates, etc. While the background copy process operates, the storage system may continue to process data access requests directed to the lun. Such processing is described further below in reference to procedure 600.

Once all of the data has been copied from the source lun to the destination lun, the storage system quiesces processing of data access requests directed to the source lun in step 525. The appropriate lun maps are then modified in step 530. Illustratively, each lun map 300 within the storage system that references the source lun is modified so that the source lun's physical lun value is replaced with the destination lun's physical lun value. As a result, when data access requests are received by the storage system, the SCSI target module forwards the requests to the destination lun for servicing. Once the lun maps have been modified, the storage system begins processing data access requests using the destination lun in step 535. The procedure 500 then completes in step 540.

FIG. 6 is a flowchart illustrating the steps of a procedure 600 for processing data access requests during lun migration in accordance with an illustrative embodiment of the present invention. The procedure 600 begins in step 605 and continues to step 610 where a data access request that is directed to the lun being migrated is received by the storage system. If the data access request is a read request, the procedure continues to step 615 where the requested data is read from the source lun and returned to the requesting client. The procedure then completes in step 655.

However, if the data access request is a write request, the procedure continues from step 610 to step 620 where the file system creates a copy of the request and directs the copy to the destination lun. That is, the file system creates a duplicate write request, with the duplicate request directed to the destination lun instead of the source lun. In step 625 the write requests, i.e., the received request and the copied request, are issued to the source and destination luns, respectively. In this way, both the source and destination luns are updated in a coherent manner. The file system determines, in step 630, whether both of the requests succeeded. If both succeeded, the procedure branches to step 655 and completes as the source and destination luns are coherent with respect to newly written data of the request.

However, if both did not succeed, the procedure continues to step 635 and determines if the request directed to the source lun failed, but the request directed to the destination lun succeeded. If so, the procedure branches to step 645 and returns an error to the client. If the write request directed to the destination lun is the only one that succeeds, then there exists the possibility of the data being overwritten should the background copy process copy the corresponding data block from the source lun to the destination lun. Similarly, should a read request be received and processed at the source lun, the result would contain stale data.

If the write request to the destination lun did not succeed, the procedure branches to step 640 and determines whether the request to the source lun succeeded, but the request to the destination failed. If so, the procedure continues to step 650 where the file system alerts the background process to copy the blocks affected by the write request. In this case, the new data is persistently stored on the source lun and the background copy process copies the data to the destination lun in the course of its operations. Should a read request be received, it will be processed using the "up to date" data from the source lun. However, if both of the write requests failed, then the procedure branches to step 645 and an error is returned to the client before the procedure completes in step 655.

Figure 7:
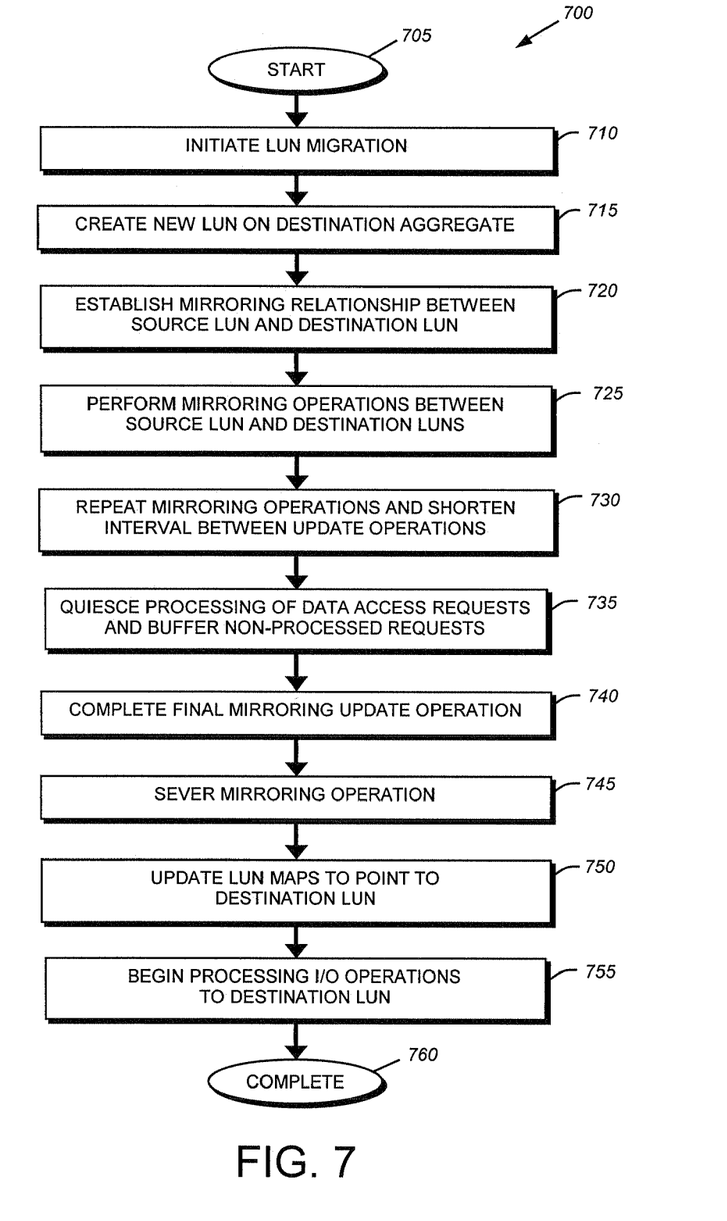
FIG. 7 is a flowchart illustrating the steps of a procedure for performing lun migration in accordance with an illustrative embodiment of the present invention.

FIG. 7 is a flowchart detailing the steps of a procedure 700 for lun migration in accordance with an illustrative embodiment of the invention. The procedure 700 begins in step 705 and continues to step 710 where the lun migration is initiated. As noted above, the initiation of the lun migration may be by, e.g., an administrator command or by an automated process. In response to the initiation of the lun migration, a new destination lun is created on the destination aggregate in step 715 using, e.g., conventional lun creation functions of the file system.

A mirroring relationship is then established between the source and destination luns in step 720. The mirroring relationship may be established using the mirroring process to establish, e.g., an asynchronous mirror between the source and the destination luns. In alternate embodiments, a synchronous mirror may be utilized. As such, the description of asynchronous mirroring operations should be taken as exemplary only. The mirroring process performs conventional asynchronous mirroring operations between the source and destination luns in step 725. Over time, the mirroring process repeats the mirroring operations and gradually shortens the update interval in step 730. For example, an initial update interval may be 12 hours, with it gradually being shortened to 5 minutes in duration. As each update interval becomes shorter, the time required to perform the mirroring operations decreases and the source and destination luns become almost consistent. For example, by shortening the update interval to 5 minutes, the destination lun is 5 minutes "behind" the state of the source lun. Once the update interval has been shortened so that the source and destination are almost consistent, processing of data access requests are quiesced and buffered in step 735. A final mirror update occurs in step 740 to render the source and destination luns consistent. At this point, the data in the source and destination luns are substantially identical.

Once the source and destination luns are consistent, the mirroring relationship is severed in step 745 by, e.g., modifying a configuration of the mirroring process to no longer perform mirroring operations between the source and destination luns. The SCSI target module then updates the lun maps to point to the destination lun in step 750. The storage system may then begin processing data access requests directed to the destination lun in step 755. That is, data access requests received by the storage system and directed to the virtual lun that was formerly mapped to the physical lun representative of the source lun are re-directed (by the modified lun map) to the physical lun representative of the destination lun. The procedure 700 completes in step 760.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for migrating a first virtual disk from a first flexible volume to a second flexible volume on a storage system having a processor and a memory, comprising:
   creating a second virtual disk on the second flexible volume;
   initiating a copy process to copy data from the first virtual disk to the second virtual disk;
   receiving a data access request directed to the data being copied from the first virtual disk to the second virtual disk;
   in response to the data access request, that is directed to the data being copied, being a read request, reading the data from the first virtual disk; and
   in response to the data access request, that is directed to the data being copied, being a write request,
      creating a copy of the write request,
      issuing the write request to the first virtual disk,
      issuing the copied write request to the second virtual disk, and
      determining whether the write request at the first virtual disk and the copied write request at the second virtual disk succeed, copying new data associated with the write request from the virtual disk to the second virtual disk in response to determining that the write request and the copied write request did not succeed.

2. The method of claim 1 wherein the first flexible volume and second flexible volume are contained within one or more aggregates.

3. The method of claim 1 further comprising mapping a virtual lun to a physical lun in response to a completion of the copy process.

4. The method of claim 3 wherein mapping the virtual lun to the physical lun comprises modifying a mapping data structure to reference the second virtual disk in place of the first virtual disk.

5. The method of claim 3 further comprising using a SCSI target module of the storage system to map the virtual lun to the physical lun.

6. The method of claim 4 wherein the mapping data structure includes a plurality of fields, each field mapping the virtual lun to the physical lun.

7. A system configured to migrate a first virtual disk from a first flexible volume to a second flexible volume on a storage system having a memory, comprising:
   a processor operatively connected to the storage system configured to execute a storage operating system, the storage operating system configured to execute a copy process to copy data from the first virtual disk to a second virtual disk at the second flexible volume; and
   the storage operating system further configured to:
      receive a data access request directed to the data being copied from the first virtual disk to the second virtual disk,
      in response to the data access request being a read request, read the data from the first virtual disk, and
      in response to the data access request being a write request,
         create a copy of the write request, issue the write request to the first virtual disk, issue the copy of the write request to the second virtual disk, determine whether the write request at the first virtual disk and the copy of the write request at the second virtual disk succeeded, and copy new data associated with the write request from the first virtual disk to the second virtual disk in response to determining that the write request succeeded and the copy of the write request did not succeed.

8. The system of claim 7 wherein the first flexible volume and second flexible volume are contained within one or more aggregates.

9. The system of claim 7 further comprising a module of the storage operating system configured to map a virtual lun to a physical lun in a mapping data structure of the storage system in response to a completion of the copy process.

10. The system of claim 9 wherein the mapping data structure includes a plurality of fields, each field mapping the virtual lun to the physical lun.

11. A method for migrating a first virtual disk from a first flexible volume to a second flexible volume on a storage system having a processor and a memory, comprising:
    generating the first flexible volume;
    creating a second virtual disk on the second flexible volume;
    in response to a received data access request being a write request,
       processing the write request at the first virtual disk,
       processing a copy of the write request at the second virtual disk,
       determining whether the write request at the first virtual disk and the copy of the write request at the second virtual disk succeeded, and
       copying new data associated with the write request from the first virtual disk to the second virtual disk in response to determining that the write request at the first virtual disk succeeded and the copy of the write request at the second virtual disk did not succeed; and
    in response to the received data access request being a read request, processing the read request at the first virtual disk.

12. The method of claim 11 further comprising:
    establishing a mirroring relationship between the first virtual disk and the second virtual disk;
    performing a plurality of mirroring operations between the first virtual disk and the second virtual disk; and
    quiescing processing of data access requests directed to the first virtual disk; and
    performing a final mirroring operation between the first virtual disk and the second virtual disk.

13. The method of claim 12 further comprising mapping a virtual lun to a physical lun in a mapping data structure of the storage system in response to completion of the final mirroring operation.

14. The method of claim 12 wherein the plurality of mirroring operations comprise asynchronous mirroring operations.

15. The method of claim 12 wherein the final mirroring operation renders the first virtual disk and second virtual disk consistent.

16. The method of claim 11 wherein the first flexible volume and second flexible volume are contained within one or more aggregates.

17. The method of claim 13 wherein mapping the virtual lun to the physical lun comprises modifying the physical lun to reference the second virtual disk in place of the first virtual disk.

18. A system configured to migrate a first virtual disk from a first flexible volume to a second flexible volume on a storage system having a memory, comprising:
a processor operatively connected to the storage system and configured to execute a storage operating system of the storage system;
the storage operating system configured to:
create a second virtual disk on the second flexible volume,
receive a data access request directed to data of the first virtual file disk as it is being migrated from the first flexible volume to the second flexible volume on the storage system,
in response to the data access request being a read request, execute the read request at the first virtual disk, and
in response to the data access request being a write request, copy the write request, execute the write request at the first virtual disk, execute the copied write request at the second virtual, determine whether the write request at the first virtual disk and the copied write request at the second virtual disk succeeded, and copy new data associated with the write request from the first virtual disk to the second virtual disk in response to determining that the write request at the first virtual disk succeeded and the copied write request at the second virtual disk did not succeed.

19. The system of claim 18 wherein a SCSI target module is further configured to utilize a mapping data structure so that a physical lun references a virtual lun associated with the second virtual disk in place of the first virtual disk.

20. The system of claim 18 wherein the first flexible volume and second flexible volume are contained within one or more aggregates.

21. The system of claim 19 wherein the processor is further configured to execute a mirroring module of the storage operating system, the mirroring module configured to perform a plurality of mirroring operations between the first virtual disk of the first flexible volume and the second virtual disk of the second flexible volume, the processor further configured to execute the mirroring module to perform a final mirroring operation between the first virtual disk and the second virtual disk in response to the storage operating system quiescing processing of data access requests directed to the first virtual disk.

22. The system of claim 18 wherein the first virtual disk and second virtual disk comprise special files.

23. The system of claim 21 wherein the mirroring module is initiated in response to an administrator command.

24. The system of claim 21 wherein the mirroring module is initiated by an automated process.

25. A non-transitory computer-readable storage medium containing executable program instructions for execution by a processor, comprising:
program instructions that create a first virtual disk on a first flexible volume, wherein the first virtual disk stores data;
program instructions that create a second virtual disk on a second flexible volume;
program instructions that initiate migration of data from the first virtual disk to the second virtual disk;
program instructions that receive a data access request during the migration of the data from the virtual disk to the second virtual disk;
program instructions that, in response to the data access request being a read request, execute the read request at the first virtual disk; and program instructions that, in response to the data access request being a write request, copy the write request, issue the write request at the first virtual disk, issue the copy of the write request at the second virtual disk, determine whether the write request at the first virtual disk and the copy of the write request at the second virtual disk succeeded, and copy new data associated with the write request from the first virtual disk to the second virtual disk in response to determining that the write request at the first virtual disk succeeded and the copy of the write request at the second virtual disk did not succeed.

26. The method of claim 1 wherein initiating the copy process comprises throttling copy operations of the copy process.

27. The method of claim 1 further comprising quiescing processing of one or more data access requests at the first virtual disk once all the data has been copied to the second virtual disk.

28. The system of claim 9 wherein the module comprises a SCSI target module.

29. The non-transitory computer-readable storage medium of claim 25 further comprising:
program instructions that establish a mirroring relationship between the first virtual disk and the second virtual disk;
program instructions that perform a plurality of mirroring operations between the first virtual disk and the second virtual disk;
program instructions that quiesce processing of data access requests directed to the first virtual disk; and
program instructions that perform a final mirroring operation between the first virtual disk and the second virtual disk.

30. The method of claim 12 wherein a next mirroring operation of the plurality of mirroring operations comprises a shorter update interval than a previous mirroring operation of the plurality of mirroring operations.

31. The non-transitory computer-readable storage medium of claim 25 further comprising program instructions that map a virtual lun to a physical lun in a mapping data structure of the storage system.

32. The computer-readable medium of claim 31 wherein the mapping data structure includes a plurality of fields, each field mapping the virtual lun to the physical lun.

33. The system of claim 18 wherein a mapping data structure includes a plurality of fields, where each field maps a virtual lun to a physical lun.

* * * * *

UNITED STATES PATENT AND TRADEMARK OFFICE
CERTIFICATE OF CORRECTION

PATENT NO. : 8,380,674 B1
APPLICATION NO. : 11/971329
DATED : February 19, 2013
INVENTOR(S) : David Brittain Bolen et al.

Page 1 of 2

It is certified that error appears in the above-identified patent and that said Letters Patent is hereby corrected as shown below:

In the Specification

In col. 7, line 26 should read:
~~stores age~~ storage system.

In col. 7, line 39 should read:
byte (kB) blocks and using index nodes ("~~modes~~inodes") to identify In col. 7, line 43 should read:
metadata files include, among others, an ~~mode~~inode file. A file In col. 7, line 44 should read:
handle, i.e., an identifier that includes an ~~mode~~ inode number, is In col. 7, line 45 should read:
used to retrieve an ~~mode~~inode from disk.

In col. 7, line 46 should read:
Broadly stated, all ~~modes~~ inodes of the write-anywhere file system In col. 7, line 47 should read:
are organized into the ~~mode~~ inode file. A file system (FS) info block In col. 7, line 49 should read:
includes an ~~mode~~ inode of a file that includes all other ~~modes~~ inodes of the In col. 7, line 52 should read:
a RAID group. The ~~mode~~ inode of the root FS info block may Signed and Sealed this
Fourth Day of June, 2013

Teresa Stanek Rea
*Acting Director of the United States Patent and Trademark Office*

CERTIFICATE OF CORRECTION (continued)
U.S. Pat. No. 8,380,674 B1

In col. 7, line 53 should read:
directly reference (point to) blocks of the ~~mode~~ inode file or may In col. 7, line 54 should read:
reference indirect blocks of the ~~mode~~ inode file that, in turn, refer- In col. 7, line 55 should read:
ence direct blocks of the ~~mode~~ inode file. Within each direct block In col. 7, line 56 should read:
of the ~~mode~~inode file are embedded ~~modes~~inodes, each of which may In col. 8, line 2 should read:
the ~~mode~~ inode file using the ~~mode~~ inode number to access an appropriate In the Claims In col. 16, line 52 should read:
The ~~non-transitory~~ computer-readable storage medium